Dec. 4, 1956     H. F. KELLER     2,772,503
FISHING DEVICE
Filed Nov. 22, 1952     2 Sheets-Sheet 1
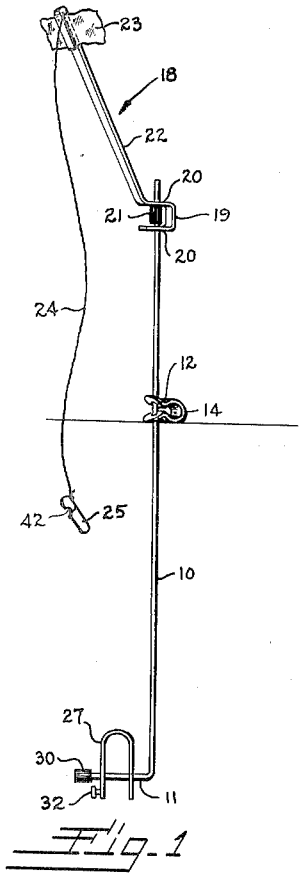
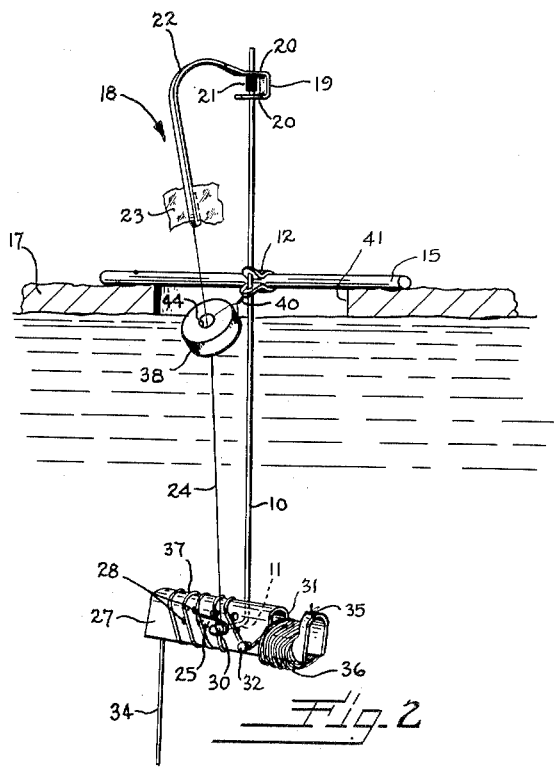
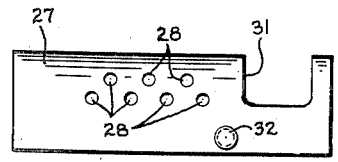
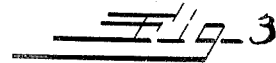
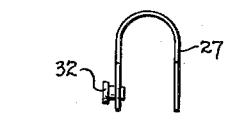
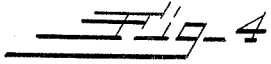
INVENTOR.
HUGO F. KELLER
BY
Richard von K. Bruns
Attorney Dec. 4, 1956　　　　　H. F. KELLER　　　　　2,772,503
　　　　　　　　　　　FISHING DEVICE Filed Nov. 22, 1952　　　　　　　　　　2 Sheets-Sheet 2

INVENTOR.
HUGO F. KELLER
BY
Richard von K. Bruns
　　Attorney

United States Patent Office 2,772,503
Patented Dec. 4, 1956

2,772,503

FISHING DEVICE

Hugo F. Keller, Oneida, N. Y.

Application November 22, 1952, Serial No. 321,988

2 Claims. (Cl. 43—17)

This invention relates to fishing apparatus, and has particular reference to a novel fishing device for use in various types of ice fishing in the winter time or in connection with a set or throw line at other times of the year.

In general, the invention contemplates a fishing device including supporting members and a novel spinner element pivotally mounted on one of the supporting members. The spinner element is adapted to support at various points along its length the reserve or unused winding of a fishing line, the slack windings and the weighted line out; and is provided with adjustable means which permit it to be maintained in various preselected angular positions on its support member regardless of the weight distribution of the line carried. This feature of the spinner permits the slack line to be smoothly and easily payed out therefrom, and at the same time results in a rocking action of the spinner as the slack is removed.

For ice fishing, the invention provides that the spinner element may be supported either above or below the surface of the water. When the spinner is supported above the water, a bite is signalled by the rocking action thereof as the slack line is taken by the fish. When the spinner is positioned below the water, an external signalling means is used in connection with it to indicate that a fish has taken the line. If the invention is used for fishing with a set or throw line, the spinner is mounted in a different manner on a supporting member but the rocking action thereof is again utilized to signal a bite, all as will be more fully described hereinafter.

In addition to the sprinner or rocking action of the spinner element and adjustability thereof to compensate for the weight of the sinker and bait, as mentioned above, the fishing device of the invention is adjustable for proper depth of water and also for thickness of ice. The device is further provided with means whereby the slack line may be controlled so that a fish can take only a predetermined amount of slack and no more, whether the fisherman is in attendance at the time of the bite or not.

With the foregoing and other considerations in view, it is a primary object of this invention to provide a novel fishing device which may be used for various types of ice fishing as well as for a set or throw line in open water.

Another important object of the invention is to provide a spinner element having adjustable means to compensate for the weight distribution of the fishing line carried thereby, and having a smooth and uniform rocking movement as the slack line is removed therefrom.

A further object of the invention is to provide a fishing device which is adjustable for depth of water and thickness of ice.

Another object of the invention is to provide a fishing device having means to positively control the amount of slack line that can be taken by a fish.

Still another object of the invention is to provide a fishing device that is of strong and durable construction, and at the same time is relatively inexpensive to manufacture.

The invention consists in the novel features and in the combinations and constructions hereinafter set forth and claimed.

In describing this invention, reference is had to the accompanying drawings in which like characters designate corresponding parts in all the views.

Figure 1 is a side elevation of the fishing device of the invention adapted for ice fishing with the spinner element supported below the water.

Figure 2 is a perspective view of the fishing device showing it in set position for ice fishing with the spinner element supported below the water.

Figure 3 is an enlarged side elevation view of the preferred form of spinner element.

Figure 4 is an end elevation view of the spinner element of Figure 3.

Figure 5:
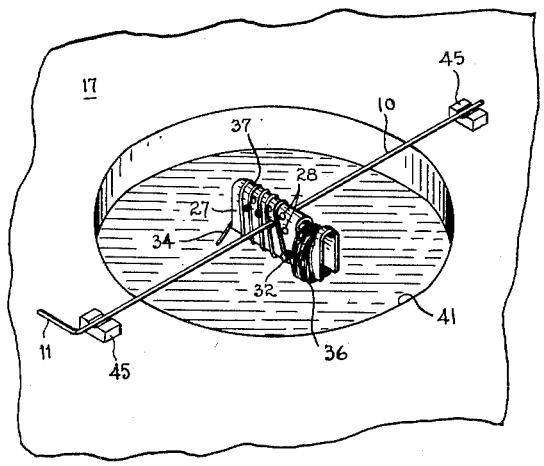
Figure 5 is a perspective view of the fishing device showing it in a set position for ice fishing with the spinner element supported above the water.

In describing the details of the typical embodiments of the invention illustrated in the accompanying drawings, attention is initially directed to Figures 1 and 2 wherein the fishing device is assembled for ice fishing with the spinner element supported below the surface of the water. The primary supporting member of the device is indicated at 10 and comprises a relatively long, substantially rigid rod, one end portion 11 of which is bent at a right angle to the axis of the main portion of the rod. Rod 10 is provided with a resilient clamp 12 having cooperating holes in the outwardly flaring ends thereof to receive the rod. When the ends of clamp 12 are pressed together, the holes register sufficiently well so that the clamp may be easily moved along the length of the rod and selectively positioned at any desired point. Releasing the clamp ends allows them to spring outwardly so that they bind on the rod and frictionally hold the clamp in position. The loop 14 of the clamp is adapted to receive a cross support such as a rod or wood dowel 15 which may be positioned across a hole in the ice 17 to support the rod 10 substantially upright in the hole as shown in Figure 2.

In this manner of fishing, the bent portion 11 of the rod 10 extends into the water and the opposite end of the rod is provided with detachably mounted signalling means generally indicated at 18. Signalling means 18 includes a bracket 19 having aligned holes in the legs 20 thereof to receive the rod, the bracket being mounted on the rod by inserting the latter through one of the legs, positioning a rubber grommet 21 on the rod and then inserting the rod through the other leg so that the bracket is loosely secured in position. A flexible, resilient strip member 22 of some suitable material such as light spring metal is secured to one leg of the bracket, and a fabric flag 23 is attached to the outer extremity of strip 22 as by bending the strip back upon itself to clamp the flag thereto. Also attached to the outer end of strip 22 is a flexible wire 24 which is preferably of copper. A trigger element 25 is secured to this wire for a purpose to be explained hereinafter.

Pivotally mounted on the bent portion 11 of rod 10 is the spinner element 27. Spinner 27, as may be best seen from Figures 3 and 4, is an elongated, rigid member which is preferably formed of non-corrosive metal and which has a channel shaped or inverted U-shaped cross section. The spinner is provided with a plurality of holes 28 in each side wall thereof, the holes in each wall being transversely aligned with corresponding holes in the opposite wall. The bent portion 11 of the rod is adapted to pass through any selected pair of transversely aligned holes 28, and the spinner is maintained on the rod by sliding a rubber grommet 30 on the end of the portion 11 after the spinner has been positioned thereon. All of the holes 28 are located above the center of gravity of the spinner element 27 so that the pivot point of the spinner will always be above the center of gravity regardless of which pair of holes receives the transverse supporting axis. A saddle like portion of the top and side walls of the spinner 27 is cut away as indicated at 31, and the remaining portions of the side walls at this portion of the spinner are adapted to receive the unused or reserve windings of the fishing line as shown in Figure 2. The purpose of cut away portion 31 is to locate the center of these windings below the pivot point of the spinner and close to the lower edges of its side walls so that the weight of the windings will assist in obtaining proper spinner action as will be explained hereinafter. Secured to one side wall of spinner 27 is a resilient plug or knob 32 of some suitable material such as rubber. Knob 32 is provided so that one or two turns of line may be taken around it to prevent the reserve line from unwinding. Since the knob is of a soft material it can not cut through or otherwise injure the line.

In operation, one end of the fishing line 34 is tied to the spinner 27 at 35, Figure 2, and the reserve line is wound around the spinner at the cut away portion 31. The other end of the line is then baited and provided with a weight such as a sinker. Having determined the depth of water, the proper amount of line to have out and also the amount of slack line may be decided upon. A turn or two of the line is then taken around the knob 32 between the reserve or unused windings 36 and the slack line and line to be put out. The slack line is wound around the opposite end portion of the spinner body from the reserve windings, as indicated at 37, until only the desired amount of line out remains extending downwardly from the spinner as shown. Thus prepared, the spinner and line supported thereby is positioned on the bent portion 11 of rod 10 so that the spinner and line will balance in a substantially horizontal position. This is acomplished by selectively passing portion 11 of the rod through the pair of holes 28 which is closest to the desired balance point, and the particular pair of holes which will meet this requirement will of course depend upon the relative weights of the reserve line windings 36, slack windings 37 and line out including the weight of the bait and sinker.

Having located the spinner and line on the rod 10 in the above described manner, the clamp 12 is positioned on the rod at the proper point to allow for the thickness of the ice and depth of water in which the spinner is to be supported. An anti-freeze member 38, such as a cake of bonded sodium chloride, is secured to clamp 12 as by a length of wire 40 so that the member 38 will be positioned at water level when the device is set as shown in Figure 2. Anti-freeze member 38 serves to keep the hole 41 in the ice from freezing over, and a member two inches in diameter, for example, will so serve for approximately eight hours. After a member 38 has dissolved it can easily be replaced with a new member. The trigger element 25 is formed with a notch 42 in one edge thereof, and to set the fishing device the trigger is threaded through a hole 44 in the anti-freeze member 38 and positioned between the side wall of the spinner 27 and grommet 30 with the notch 42 engaging portion 11 of the rod. The slack line is then wound tightly over the trigger 25 to hold it in this position. Securing trigger 25 in this manner causes the flexible strip 22 of the signalling means to be bent over with its flag 23 down, and the device when so rigged is in set position. A rod 15 is passed through the loop 14 in the previously adjusted clamp 12 and the set device is then lowered through the hole in the ice until it is supported as shown in Figure 2.

When a fish strikes and takes the hook the slack windings 37 on the spinner are paid out smoothly until the trigger 25 is released allowing the strip 22 and flag 23 to spring up and signal a bite. The pull on the line causes a rocking action of the spinner on portion 11 of the rod 10, and this rocking action enables the easy removal of the slack line. The spinner will never pivot far enough to turn completely over, however, since the location of reserve windings 36 and location of its center of gravity below the pivot point will prevent such an occurrence. The turns of line about knob 32 on the spinner effectively prevent the fish from taking any more than the desired amount of slack line, and thus are an effetcive stop to prevent the reserve line from being run out. The above described method of ice fishing is advantageous, of course, because the spinner and line is positioned below the water where the line can not freeze. This method is also of advantage in localities where the fishing devices need not be attended since the signalling arrangement provides a simple and practical method of signalling a bite.

Having reference now to Figure 5, the invention is shown as it would be assembled for ice fishing with the spinner 27 positioned above the water. This method of fishing contemplates that the device will be attended so the signalling means 18 has been removed from rod 10 and the main portion of the rod is used as the horizontal support and transverse axis for the spinner. The spinner and line 34 are rigged as previously described and again balanced substantially horizontally on rod 10 by passing the latter through the proper pair of holes 28 in the spinner. The rod 10 may be supported at either end as by blocks of wood 45 resting on the ice 17. When the bait is taken by a fish, the spinner 27 will rock when the slack windings 37 are removed therefrom and this movement will notify the attendant of the bite.

Figure 6:
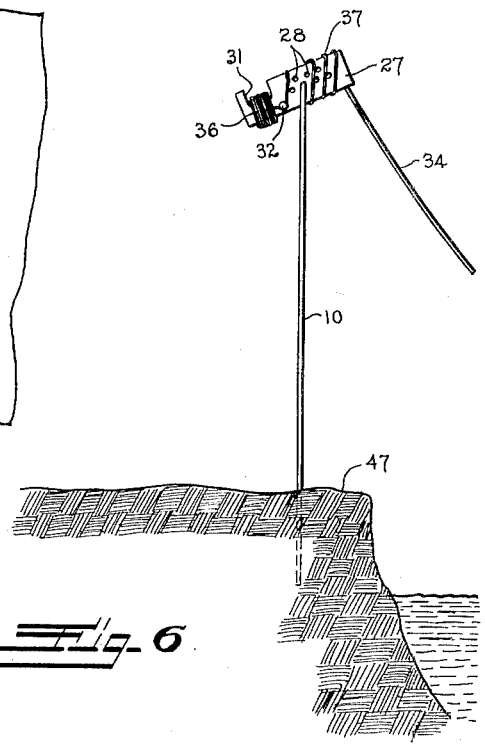
Figure 6 is a side elevation of the fishing device showing its use in connection with a set or throw line.

In Figure 6 the invention is illustrated as it would be assembled for fishing with a set or throw line when there is no ice on the water. In this application of the device, the straight end of rod 10 is stuck in the bank 47 of a river or lake and the spinner 27, which has been rigged with line 34 as described above, is positioned on the bent portion 11 of the rod which is now at the upper end thereof. In this arrangement of the device, however, the portion 11 will be passed through a pair of holes 28 so that the spinner and line are maintained at a slight angle with the horizontal, that is, the portion of the spinner supporting slack windings 37 and the line out is above the portion supporting the reserve windings 36. This arrangement permits the slack line to be payed out as before but the slight overbalance on the reserve winding end of the spinner provides increased insurance that the spinner will always return to the position shown after being rocked by the removal of a turn of slack line, this added insurance being desirable when the spinner is located a considerable distance above the water as in this application of the invention. As previously mentioned, however, the proper rocking action of spinner 27 is primarily due to the particular construction of the spinner itself wherein the center of gravity is located below the pivot point and reserve windings 36 are carried close to the lower edges of the side walls.

Figure 8:
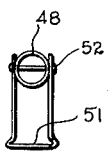
Figure 8 is an end elevation view of the spinner element of Figure 7.
Figure 7:
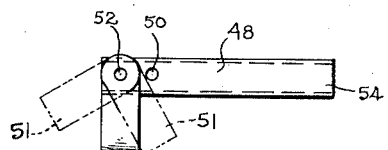
Figure 7 is a side elevation of a modified form of spinner element.

Figures 7 and 8 illustrate a modified form of spinner element wherein the body 48 of the spinner is tubular in form and only one pair of holes 50 is provided to receive a transverse support rod on which the spinner can pivot. As will be seen from Figure 7, holes 50 are not located midway between the ends of spinner body but are closer to one end than the other to unbalance the spinner when mounted on a transverse axis. This unbalance may be offset or accentuated by means of a counterweight 51 pivotally mounted on one end of the spinner body at 52, and the off center holes 50 and counterweight combine in providing the spinner with an adjustable counterbalancing means equivalent to the plurality of pairs of holes 28 in spinner 27. Counterweight 51 is frictionally held in any position into which it is moved, and thus when it is moved towards or away from the offset pivot point 52, as indicated by the phantom lines, it causes the end 54 of the spinner to be lowered or raised relative to the pivot point. In this manner, the counterweight 51 can compensate for the relative weight distribution of the spinner line windings and the line out, thereby enabling the spinner to be maintained on its supporting axis in the desired position as previously described.

From the foregoing description, it will be apparent that the invention provides a novel and useful fishing device having a number of different applications. This invention may be embodied in other specific forms without departing from the spirit or essential characteristics thereof. The embodiments disclosed are therefore to be considered in all respects as illustrative and not restrictive, the scope of the invention being indicated by the appended claims.

What I claim is:

1. In a fishing device, a rod member having an end portion thereof bent at right angles to the main axis of said member, signalling means detachably secured to the opposite end of said rod member, an elongated spinner element having a plurality of apertures formed therethrough intermediate the ends thereof, said elements being adapted to be rockably mounted at various angular positions on the bent portion of said rod member and being adapted to support the reserve windings and slack windings of a fishing line, said reserve windings being located on one side of the selected pivot point and said slack windings being located on the other side thereof, and a trigger element secured to said signalling means and engageable by said slack windings to position the signalling means in a set position, said signalling means being released from the set position to signal a bite when said slack windings are removed from said spinner element by a fish, and said spinner element being adapted to rock on said bent portion as said windings are removed.

2. A device as set forth in claim 1 wherein said signalling means includes a flag secured to said rod member by a resilient element and said trigger member includes an elongated element secured to said flag by means of a flexible wire.

References Cited in the file of this patent

UNITED STATES PATENTS

| | | |
|---|---|---|
| 1,016,783 | Schmucker | Feb. 6, 1912 |
| 1,826,251 | Laurila | Oct. 6, 1931 |
| 1,980,255 | Covich | Nov. 13, 1934 |
| 2,136,864 | Paquette | Nov. 15, 1938 |
| 2,138,299 | Gruebel | Nov. 29, 1938 |
| 2,195,356 | Biddinger | Mar. 24, 1940 |
| 2,693,046 | Langevin | Nov. 2, 1954 |